US009035605B2

(12) United States Patent
Tabata et al.

(10) Patent No.: US 9,035,605 B2

(45) **Date of Patent: *May 19, 2015**

(54) NON-CONTACT CHARGING MODULE, ELECTRONIC APPARATUS, AND NON-CONTACT CHARGING APPARATUS

(75) Inventors: Kenichiro Tabata, Oita (JP); Tokuji Nishino, Oita (JP); Toshiaki Kikui, Oita (JP); Tatsunori Tabata, Miyazaki (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/343,536

(22) PCT Filed: Aug. 31, 2012

(86) PCT No.: PCT/JP2012/005508

§ 371 (c)(1), (2), (4) Date: Mar. 7, 2014

(87) PCT Pub. No.: WO2013/035282

PCT Pub. Date: Mar. 14, 2013

(65) Prior Publication Data

US 2014/0217970 A1 Aug. 7, 2014

(30) Foreign Application Priority Data

Sep. 8, 2011 (JP) ................................ 2011-195819

(51) Int. Cl.

*H02J 7/00* (2006.01)

*H02J 7/02* (2006.01)

(Continued)

(52) U.S. Cl.

CPC ................ *H02J 7/025* (2013.01); *H01F 38/14* (2013.01); *H01M 10/46* (2013.01); *H01F 7/0247* (2013.01)

(58) Field of Classification Search

CPC ................................ H02J 7/0025; H02J 5/005

See application file for complete search history.

(56) References Cited

U.S. PATENT DOCUMENTS 8,193,767 B2 6/2012 Inoue et al.

8,547,058 B2 * 10/2013 Tabata et al. ................. 320/108

(Continued)

FOREIGN PATENT DOCUMENTS

CN 201402855 Y 2/2010

CN 101971452 A 2/2011

(Continued)

OTHER PUBLICATIONS

International Search Report for Application No. PCT/JP2012/005508 dated Nov. 6, 2012.

(Continued)

*Primary Examiner* — Drew A Dunn

*Assistant Examiner* — Steve T Chung

(74) *Attorney, Agent, or Firm* — Pearne & Gordon LLP

(57) ABSTRACT

This non-contact charging module can be suitably used by suppressing a change of an L value of a coil that is provided in the non-contact charging module, and achieves size reduction, even in the cases where a magnet that is provided in the other non-contact charging module is used or not used. The module is characterized in that: the module is provided with a primary side coil (21*a*) wherein a conducting line is wound in a substantially rectangular shape, and a magnetic sheet (51) that is provided with a surface on which the primary side coil (21*a*) is placed; and that a substantially rectangular-shaped hollow portion of the primary side coil (21*a*) has the short side thereof shorter than the diameter of a circular magnet (30*a*), and the long side thereof longer than the diameter of the circular magnet (30*a*).

6 Claims, 11 Drawing Sheets

(51) Int. Cl.

| | |
|---|---|
| ***H01F 38/14*** | (2006.01) |
| ***H01M 10/46*** | (2006.01) |
| ***H01F 7/02*** | (2006.01) |

(56) References Cited

U.S. PATENT DOCUMENTS

| | | | | |
|---|---|---|---|---|
| 8,552,684 | B2 * | 10/2013 | Tabata et al. | 320/108 |
| 2008/0122570 | A1 | 5/2008 | Takaishi | |
| 2009/0001932 | A1 * | 1/2009 | Kamijo et al. | 320/108 |
| 2009/0058358 | A1 | 3/2009 | Inoue et al. | |
| 2009/0096413 | A1 * | 4/2009 | Partovi et al. | 320/108 |
| 2009/0179812 | A1 | 7/2009 | Nakamura et al. | |
| 2009/0212637 | A1 | 8/2009 | Baarman et al. | |
| 2009/0230777 | A1 | 9/2009 | Baarman et al. | |
| 2010/0156345 | A1 * | 6/2010 | Phelps, III | 320/108 |
| 2010/0164296 | A1 * | 7/2010 | Kurs et al. | 307/104 |
| 2012/0119708 | A1 * | 5/2012 | Toya | 320/137 |
| 2012/0181876 | A1 | 7/2012 | Baarman et al. | |
| 2012/0319647 | A1 | 12/2012 | Itabashi et al. | |

FOREIGN PATENT DOCUMENTS

| | | | |
|---|---|---|---|
| CN | 102017353 | A | 4/2011 |
| JP | 2006-042519 | A | 2/2006 |
| JP | 2008-135589 | A | 6/2008 |
| JP | 2009-164923 | A | 7/2009 |
| JP | 2011-514796 | A | 5/2011 |
| JP | 2011-517926 | A | 6/2011 |
| JP | 2012-156279 | A | 8/2012 |
| WO | 2007/122788 | A1 | 11/2007 |
| WO | 2009/105615 | A2 | 8/2009 |
| WO | 2011/096569 | A1 | 8/2011 |

OTHER PUBLICATIONS

Volume I: Low Power, System Description Wireless Power Transfer, Version 1.0.1, Wireless Power Consortium, Oct. 2010, p. 11-33, 61-66.

English Translation of Chinese Search Report for CN Application No. 201280043601.X dated Oct. 11, 2014.

* cited by examiner

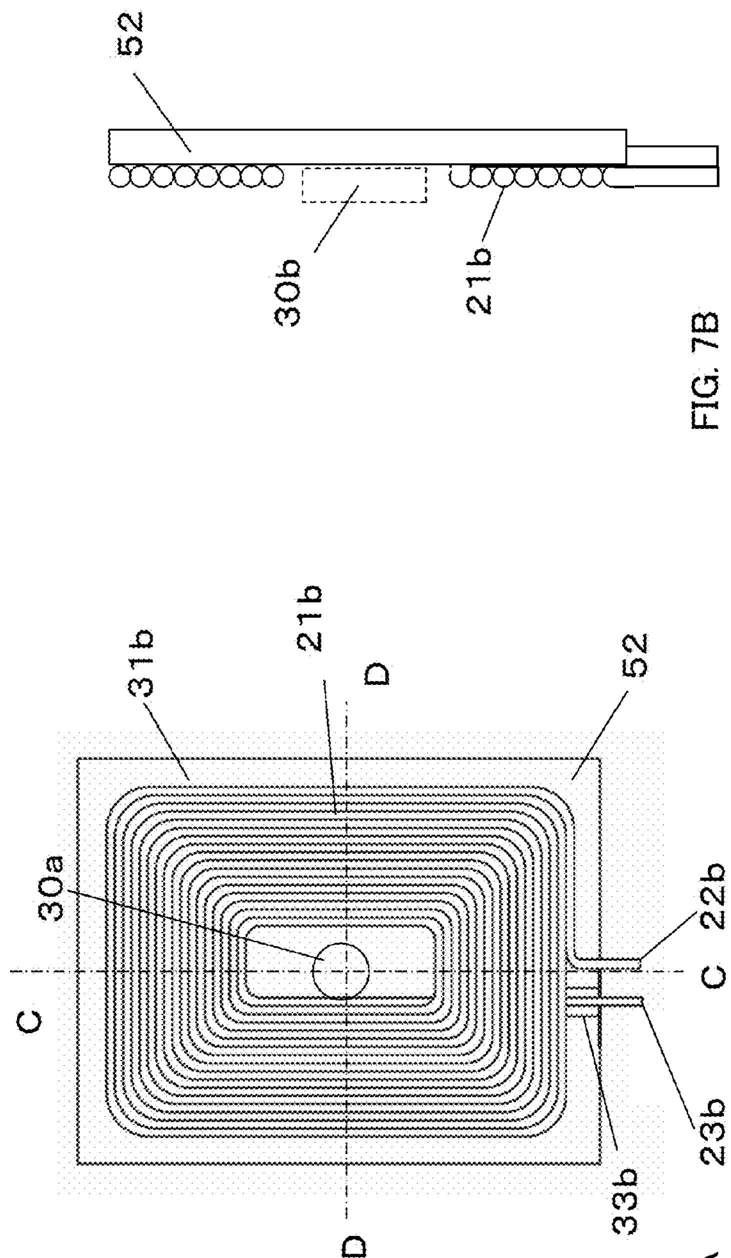
52
30b
21b
FIG. 7B
30a
31b
21b
D
52
C
C
22b
23b
33b
D
FIG. 7A
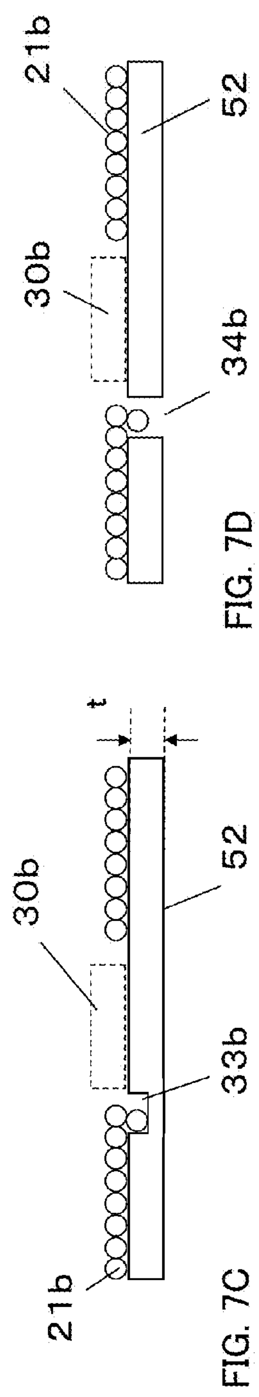
t
52
30b
33b
21b
FIG. 7C
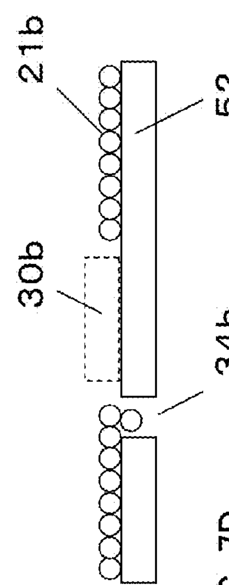
21b
52
30b
34b
FIG. 7D

NON-CONTACT CHARGING MODULE, ELECTRONIC APPARATUS, AND NON-CONTACT CHARGING APPARATUS

TECHNICAL FIELD

The present invention relates to a non-contact charging module having a planar coil portion and a magnetic sheet, and an electronic device and a non-contact charging device.

BACKGROUND ART

Recently, there have been utilized a number of apparatuses with a main unit which can be charged in a non-contact manner by a charger. In such apparatuses, non-contact charging modules are respectively provided at a charger side and a main unit side and electromagnetic induction is caused between both modules so that power is transmitted from the charger side to the main unit side. It has been also proposed to apply a mobile terminal device or the like as the main unit.

There is a need for thinner and smaller main unit and charger for the mobile terminal device, or the like. To respond to such a need, as disclosed in Patent Literature 1, it is considered to provide a planar coil portion and a magnetic sheet, which serve as a transmission side non-contact charging module and a reception side non-contact charging module.

CITATION LIST

Patent Literature

PTL 1

Japanese Patent Application Laid-Open No. 2006-42519

SUMMARY OF INVENTION

Technical Problem

Such types of non-contact charging modules require to position a primary side non-contact charging module (transmission side non-contact charging module) and a secondary side non-contact charging module (reception side non-contact charging module) accurately to efficiently cause electromagnetic induction for power transmission.

In order to position the primary side non-contact charging module (transmission side non-contact charging module) and the secondary side non-contact charging module (reception side non-contact charging module) accurately, one method is to use a magnet, an example of which is a method shown in FIG. 11. FIG. 11 illustrates a non-contact charging module (for example, a secondary side non-contact charging module) brought into position by a magnet provided at the other non-contact charging module (for example, a primary side non-contact charging module). In this method, the primary side non-contact charging module and the secondary side non-contact charging module are positioned by a magnet provided at at least one of the modules so that the magnets provided at the both modules or the magnet provided at one module and a magnetic sheet provided at the other module attract each other.

Further, there is another method in which the primary side non-contact charging module and the secondary side non-contact charging module are positioned accurately without utilizing a magnet.

For example, there is a method in which the primary side non-contact charging module and the secondary side non-contact charging module are physically (as a shape) and forcibly positioned by fitting a protruding portion formed on a charging surface of a charger provided with the primary side non-contact charging module into a recessed portion formed at an electronic device provided with the secondary side non-contact charging module. There is still another method in which the primary side non-contact charging module detects a position of a coil of the secondary side non-contact charging module to thereby automatically move a coil of the primary side non-contact charging module to the position of the coil of the secondary side non-contact charging module. There is yet another method in which a large number of coils are provided at a charger to thereby enable charging even if a mobile device is placed at anywhere on a charging surface of the charger.

However, L values of the coils provided at the respective non-contact charging modules largely vary between a case where a magnet is used for positioning the primary side non-contact charging module and the secondary side non-contact charging module and a case where a magnet is not used. Resonant frequency of the electromagnetic induction for power transmission is determined by utilizing the L values of the coils provided at the respective non-contact charging modules.

Accordingly, there is a problem in that it is difficult to share the non-contact charging modules between a case where a magnet is used for positioning the primary side non-contact charging module and the secondary side non-contact charging module and a case where a magnet is not used.

Therefore, an object of the present invention is to provide a non-contact charging module which can suppress variation of an L value of a coil provided at the non-contact charging module in both of a case where a magnet provided at the other non-contact charging module serving as a counterpart for power transmission is used and a case where a magnet is not used for positioning a primary side non-contact charging module and a secondary side non-contact charging module, and which can be suitably used in both of a case where a magnet is used and a case where a magnet is not used, and which can realize downsizing, and also to provide an electronic device and a non-contact charging device.

Solution to Problem

A non-contact charging module according to an aspect of the present invention is configured to be positioned with another non-contact charging module using a circular magnet or without using the circular magnet for positioning, the circular magnet being provided at the other non-contact charging module, the non-contact charging module including: a planar coil portion including a conductive wire wound in a substantially rectangular shape; and a magnetic sheet provided with a surface on which the planar coil portion is placed, in which the planar coil portion includes a substantially rectangular hollow portion that has a short side shorter than a diameter of the circular magnet and a long side longer than the diameter of the circular magnet.

Advantageous Effects of Invention

According to the present invention, it is possible to provide a non-contact charging module which can suppress variation of an L value of a coil provided at the non-contact charging module in both of a case where a magnet provided at the other non-contact charging module serving as a counterpart for power transmission is used and a case where a magnet is not used for positioning a primary side non-contact charging module and a secondary side non-contact charging module, and which can be suitably used in both of a case where a magnet is used and a case where a magnet is not used, and which can realize downsizing and to provide a non-contact charging device using the non-contact charging module.

BRIEF DESCRIPTION OF DRAWINGS

FIGS. 4A to 4D illustrate in detail the primary side non-contact charging module according to the embodiment of the present invention;

FIGS. 7A to 7D illustrate in detail the secondary side non-contact charging module according to the embodiment of the present invention;

DESCRIPTION OF EMBODIMENTS

Embodiment

An embodiment of the present invention will be described below with reference to the accompanying drawings.

(Regarding a Non-Contact Charging System)

Figure 1:
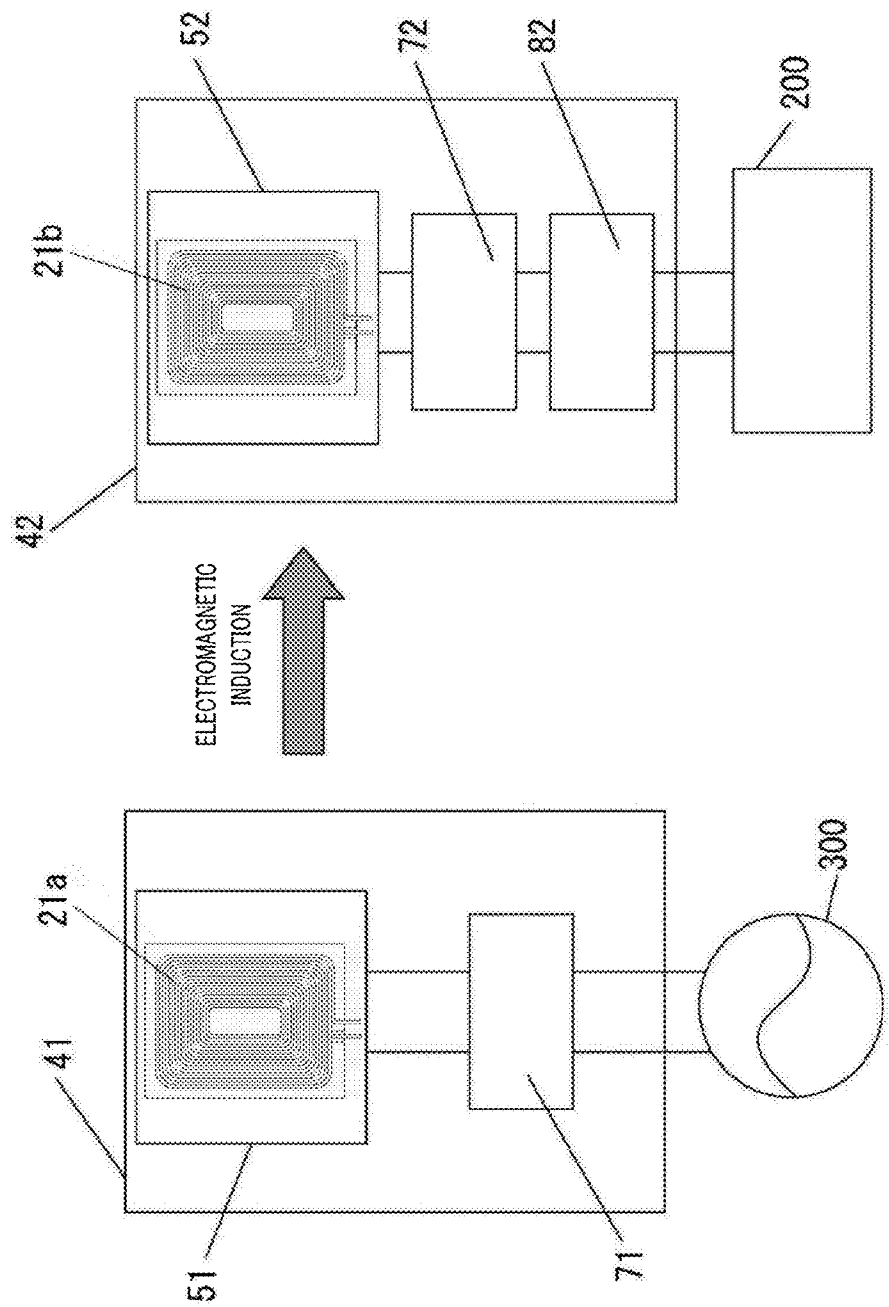
FIG. 1 is a block diagram illustrating a non-contact power transmission device according to an embodiment of the present invention.

FIG. 1 is a block diagram illustrating a non-contact power transmission device according to an embodiment of the present invention.

The non-contact power transmission device includes primary side non-contact charging module 41 (transmission side non-contact charging module) and secondary side non-contact charging module 42 (reception side non-contact charging module), and transmits power from primary side non-contact charging module 41 to secondary side non-contact charging module 42 by utilizing the action of electromagnetic induction. This non-contact power transmission device is used for transmitting power of approximately 5 W or lower and has a frequency of power transmission between approximately 110 and 205 kHz. Primary side non-contact charging module 41 is mounted on, for example, a charger, and secondary side non-contact charging module 42 is mounted on, for example, a mobile phone, a digital camera, a PC, or the like.

Primary side non-contact charging module 41 includes primary side coil 21*a*, magnetic sheet 51, a resonant capacitor (not shown) and power input section 71. Power input section 71 is connected to commercial power source 300 as an external power source to receive supply of power of approximately 100 to 240V, converts the power into predetermined current A (DC 12V, 1 A) and supplies the current to primary side coil 21*a*. Primary side coil 21*a* generates a magnetic field according to its shape, the number of turns, and the supplied current. The resonant capacitor is connected to primary side coil 21*a* and determines a resonant frequency of the magnetic field generated from primary side coil 21*a* according to a relationship with primary side coil 21*a*. The action of electromagnetic induction from primary side non-contact charging module 41 to secondary side non-contact charging module 42 occurs by this resonant frequency.

Meanwhile, secondary side non-contact charging module 42 includes secondary side coil 21*b*, magnetic sheet 52, a resonant capacitor (not shown), rectifier circuit 72 and power output section 82. Secondary side coil 21*b* receives the magnetic field generated from primary side coil 21*a*, converts the magnetic field into predetermined current B by electromagnetic induction action and outputs predetermined current B to the outside of secondary side non-contact charging module 42 via rectifier circuit 72 and power output section 82. Rectifier circuit 72 rectifies predetermined current B which is an alternating current to convert the current into predetermined current C (DC 5V, 1.5 A) which is a direct current. Further, power output section 82 is a unit for outputting power to the outside of secondary side non-contact charging module 42, through which power is supplied to electronic device 200 connected to secondary side non-contact charging module 42.

It should be noted that, as shown in FIG. 1, it is not necessary that both of primary side coil 21*a* of primary side non-contact charging module 41 and secondary side coil 21*b* of secondary side non-contact charging module 42 be a planar coil wound in a substantially rectangular shape. That is, though described in detail later, because the present invention is intended to stabilize transmission efficiency whether a magnet is provided or not provided at a counterpart (secondary side non-contact charging module 42 for primary side non-contact charging module 41, and primary side non-contact charging module 41 for secondary side non-contact charging module 42), a substantially rectangular coil may be used in only one of the non-contact charging modules.

[Regarding a Non-Contact Charger and a Primary Side Non-Contact Charging Module]

A case where primary side non-contact charging module 41 is mounted on a non-contact charger will be described.

Figure 2:
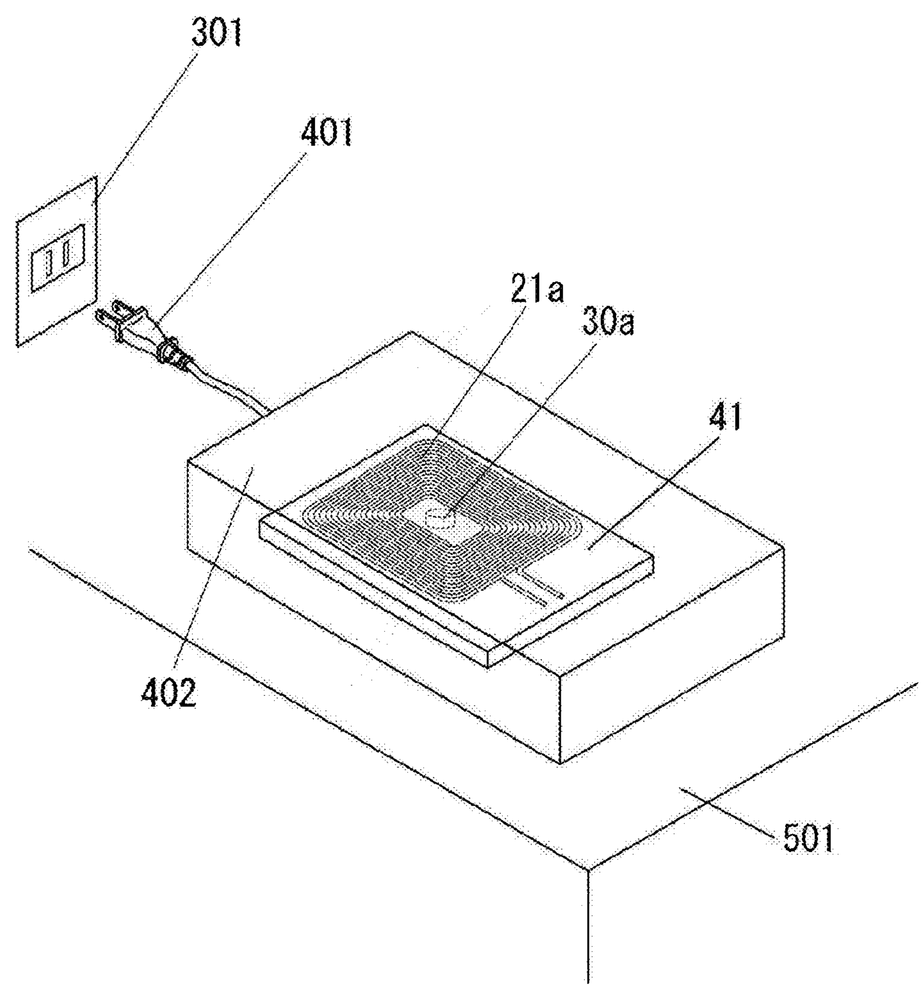
FIG. 2 illustrates a configuration of a non-contact charger according to the embodiment of the present invention.

FIG. 2 illustrates a configuration of a non-contact charger according to the embodiment of the present invention. It should be noted that FIG. 2 illustrates the configuration so that the inside of the non-contact charger can be seen.

Non-contact charger 400 which transmits power by utilizing the action of electromagnetic induction has primary side non-contact charging module 41 in a casing that forms the exterior of non-contact charger 400.

Non-contact charger 400 has a plug 401 which is inserted into outlet 301 of commercial power source 300 provided indoors or outdoors. Non-contact charger 400 can receive power supply from commercial power source 300 by plug 401 being inserted into outlet 301.

Non-contact charger 400 is provided on table 501, and primary side non-contact charging module 41 is arranged near surface 402 of non-contact charger 400 which is an opposite side of a surface of the table. A primary flat surface of primary side coil 21*a* in primary side non-contact charging module 41 is arranged parallel to surface 402 of non-contact charger 400 which is an opposite side of the surface of the table. This configuration makes it possible to secure an area for power reception operation of the electronic device provided with secondary side non-contact charging module 42. It should be noted that non-contact charger 400 may be provided on a wall surface, in which case non-contact charger 400 is arranged near a surface which is an opposite side of the wall surface.

Further, primary side non-contact charging module 41 may have magnet 30*a* to be used for performing positioning with secondary side non-contact charging module 42, in which case magnet 30*a* is arranged in a hollow portion positioned in a central area of primary side coil 21*a*.

Primary side non-contact charging module 41 will be described.

Figure 3:
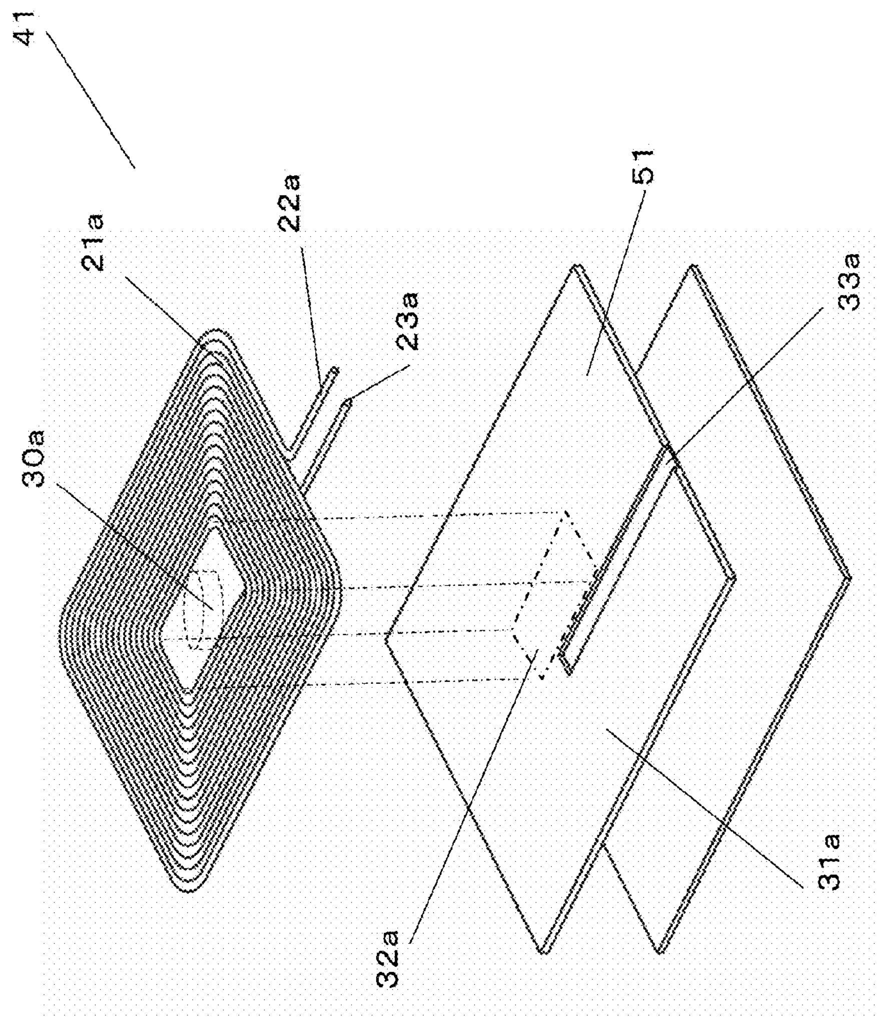
FIG. 3 illustrates a primary side non-contact charging module according to the embodiment of the present invention.

FIG. 3 illustrates a primary side non-contact charging module according to the embodiment of the present invention and illustrates a case where a primary side coil is a substantially rectangular coil.

Primary side non-contact charging module 41 includes primary side coil 21*a* which is a conductive wire wound in a spiral manner to form a substantially rectangular shape, and magnetic sheet 51 provided to face a surface of primary side coil 21*a*.

As shown in FIG. 3, a planar coil portion of primary side non-contact charging module 41 includes primary side coil 21*a* which is a conductor wound toward an outer direction in a spiral manner so as to form a substantially rectangular shape on the surface, and terminals 22*a* and 23*a* which are provided at both ends of primary side coil 21*a* as current supply portions. That is, terminals 22*a* and 23*a* which are current supply portions supply a current from commercial power source 300 which is an external power source to primary side coil 21*a*. Primary side coil 21*a* is formed of a conductive wire wound on a plane in a parallel manner, and a surface formed by the coil is referred to as a coil surface. It should be noted that a thickness direction is a direction in which primary side coil 21*a* and magnetic sheet 51 are stacked.

Magnetic sheet 51 includes flat portion 31*a* on which primary side coil 21*a* is mounted, central portion 32*a* which is located at a center of flat portion 31*a* and which corresponds to a hollow area of primary side coil 21*a*, and linear recessed portion 33*a* into which part of a drawn wire of primary side coil 21*a* is inserted. Central portion 32*a* may take any form among a protruding shape, a flat shape, a recessed shape and a through hole relative to flat portion 31*a*. If central portion 32*a* has a protruding shape, it is possible to strengthen a magnetic flux of primary side coil 21*a*. If central portion 32*a* is flat, central portion 32*a* can be easily manufactured, and primary side coil 21*a* can be easily mounted thereon, and it is possible to maintain a well-balanced relationship between the influence of a magnet for positioning and an L value of primary side coil 21*a*, which will be described later. If central portion 32*a* has a recessed shape or is a through hole, it is possible to suppress the influence of a magnet for positioning. That is, it is possible to physically keep a distance between magnet 30*b* provided at secondary side non-contact charging module 42 and magnetic sheet 51, so that it is possible to prevent reduction of magnetic permeability as a result of magnetic sheet 51 being saturated by magnet 30*b*. Accordingly, it is possible to prevent an L value of primary side coil 21*a* from varying according to the presence or absence of magnet 30*b*. Further, the recessed portion, the protruding portion or the through hole may be formed in the same shape and to have the same size as the hollow portion, or may be formed in a different shape and may be smaller than the hollow portion.

In primary side non-contact charging module 41 in this embodiment, primary side coil 21*a* is wound toward outside from a substantially rectangular hollow portion of approximately 12 mm×18 mm, and its outer end forms a rectangle of approximately 18 mm×23 mm. That is, primary side coil 21*a* is wound in a substantially rectangular doughnut shape. It should be noted that "substantially rectangular" refers to a rectangle that may include R (curved portion) at four corners.

Further, by winding the conductive wire so as to keep space from each other, floating capacitance between an upper stage conductive wire and a lower stage conductive wire becomes small, so that it is possible to suppress alternating-current resistance of primary side coil 21*a*. Further, by winding the conductive wire so as to reduce space, it is possible to reduce the thickness of primary side coil 21*a*.

Further, primary side non-contact charging module 41 may have magnet 30*a* to be used for performing positioning with secondary side non-contact charging module 42. It is defined by the standards (WPC) that magnet 30*a* should have a circular shape and should have a diameter of 15.5 mm or less and so on. Magnet 30*a* has a coin shape and has to be arranged so that its center matches a central winding axis of primary side coil 21*a* in order to reduce influence of magnet 30*a* on primary side coil 21*a*. When magnet 30*a* is provided, it is preferable to provide a hollow portion larger than magnet 30*a*.

When primary side non-contact charging module 41 has magnet 30*a*, as the first method for arranging magnet 30*a*, there is a method in which magnet 30*a* is arranged on an upper surface of central portion 32*a* of magnetic sheet 51. Further, as the second method for arranging magnet 30*a*, there is a method in which magnet 30*a* is arranged in place of central portion 32*a* of magnetic sheet 51. In the second method, because magnet 30*a* is arranged in a hollow area of primary side coil 21*a*, it is possible to make primary side non-contact charging module 41 smaller.

When a magnet is not utilized for positioning primary side non-contact charging module 41 and secondary side non-contact charging module 42, magnet 30*a* shown in FIG. 3 is not required.

Influence of a magnet on power transmission efficiency of the non-contact charging module will be described. Generally, a magnet is provided inside a hollow portion of built-in primary side coil 21*a* or secondary side coil 21*b* in at least one of the primary side non-contact charging module and the secondary side non-contact charging module. By this means, it is possible to bring the magnet and the magnet or to bring the magnet and magnetic sheet 51 as close as possible to each other and it is possible to bring the primary side coil and the secondary side coil close to each other. The magnet has a circular shape. In this embodiment, the magnet has a diameter of approximately 15.5 mm (approximately 10 mm to 20 mm), and a thickness of approximately 1.5 to 2 mm. Further, a neodymium magnet is used, and strength may be approximately 75 mT to 150 mT. In this embodiment, because there is an interval of approximately 2 to 5 mm between the coil of primary side non-contact charging module and the coil of secondary side non-contact charging module, it is possible to position the non-contact charging modules with a magnet having such a degree of strength.

When a magnetic flux is generated between primary side coil 21*a* and secondary side coil 21*b* to transmit power, if a magnet exists between or around primary side coil 21*a* and secondary side coil 21*b*, the magnetic flux extends while avoiding the magnet. Alternatively, a magnetic flux which penetrates inside the magnet causes an eddy current or heat inside the magnet, which becomes a loss. Further, as a result of the magnet being arranged near the magnetic sheet, magnetic permeability of the magnetic sheet near the magnet is lowered. Accordingly, magnet 30*a* provided at primary side non-contact charging module 41 reduces L values of both primary side coil 21*a* and secondary side coil 21*b*. As a result, transmission efficiency between the non-contact charging modules is reduced.

Figure 4A:
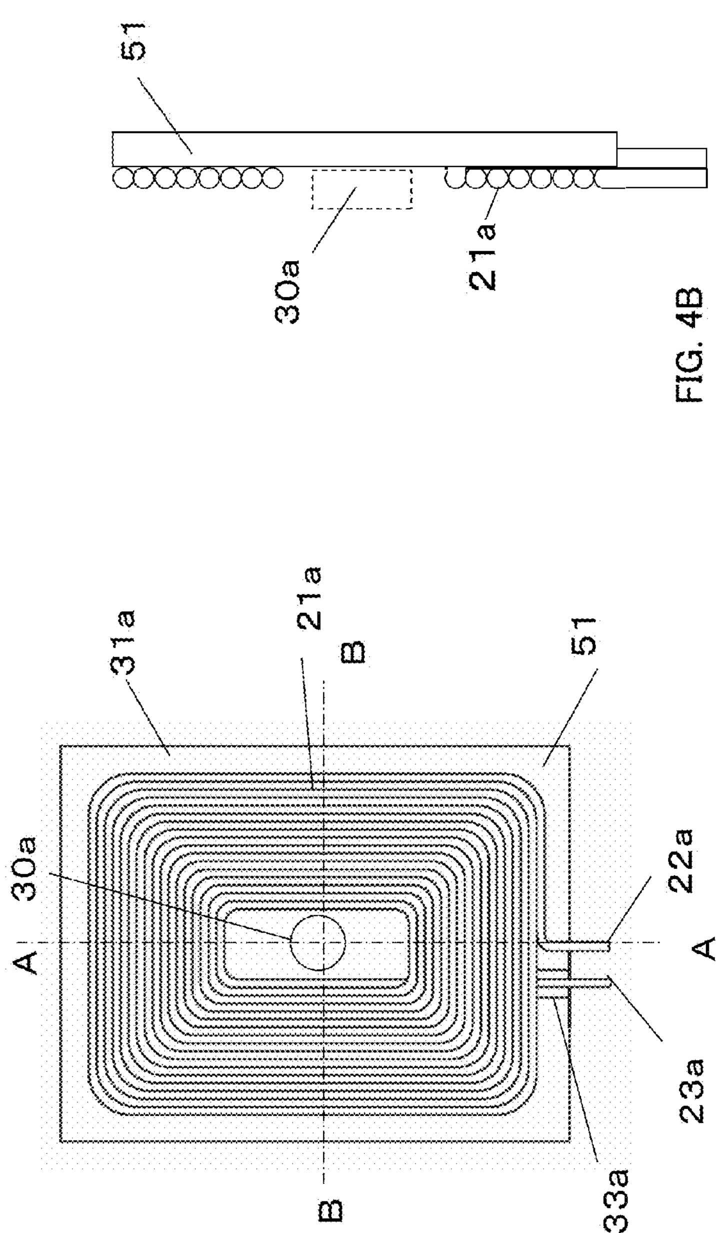
Figure 4C:
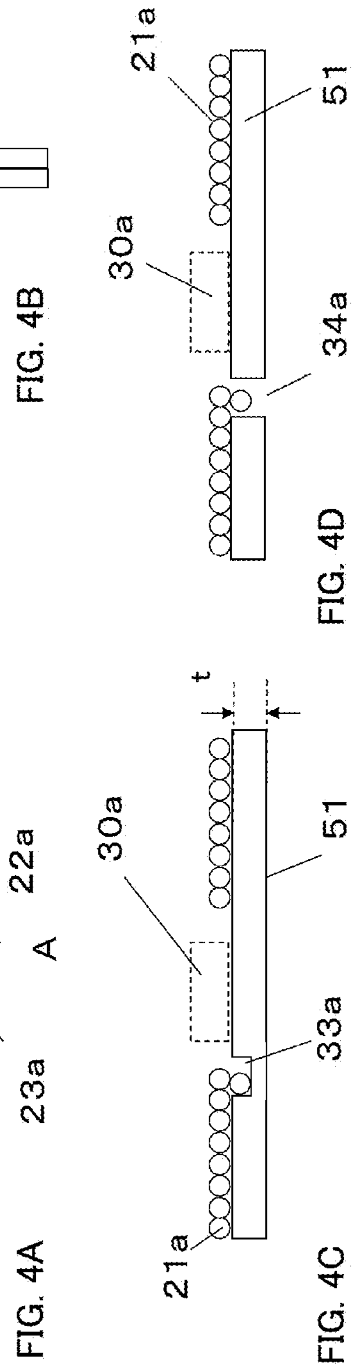

FIGS. 4A to 4D illustrate in detail the primary side non-contact charging module according to the embodiment of the present invention. FIG. 4A illustrates an upper surface of the primary side non-contact charging module, FIG. 4B illustrates a cross-section taken along A-A of the primary side non-contact charging module in FIG. 4A, FIG. 4C illustrates a cross-section taken along B-B of the primary side non-contact charging module in FIG. 4A when a linear recessed portion is provided, and FIG. 4D illustrates a cross-section taken along B-B of the primary side non-contact charging module in FIG. 4A when a slit is provided. It should be noted that FIG. 4A and FIG. 4B illustrate a case where magnet 30*a* is not provided, and if a magnet is provided, magnet 30*a* indicated by the dotted line is provided.

Primary side coil 21*a* is formed to have two stages in a thickness direction from a winding start portion positioned in the central area of primary side coil 21*a* to terminal 23*a* and to have one stage in the remaining area in order to realize thinner non-contact charger 400 on which primary side non-contact charging module 41 is mounted. In addition, the conductive wire is wound so as to keep space between the upper stage conductive wire and the lower stage conductive wire, thereby reducing floating capacitance between the upper stage conductive wire and the lower stage conductive wire, so that it is possible to suppress alternating-current resistance of primary side coil 21*a*.

When conductive wires are stacked to extend primary side coil 21*a* in a thickness direction of primary side non-contact charging module 41, it is possible to increase a current flowing through primary side coil 21*a* by increasing the number of turns of primary side coil 21*a*. When the conductive wires are stacked, by winding the conductive wire so as to reduce space between the upper stage conductive wire and the lower stage conductive wire, it is possible to increase a current flowing through primary side coil 21*a* while suppressing the thickness of primary side coil 21*a*. Further, by stacking the conductive wire in the thickness direction, because magnetic sheet 51 is positioned away from secondary side non-contact charging module 42 though primary side coil 21*a* is positioned close to secondary side non-contact charging module 42, it is possible to suppress influence of magnet 30*b* when magnet 30*b* is provided at secondary side non-contact charging module 42. Further, this can be applied to a relationship between magnet 30*a* of primary side non-contact charging module 41, and secondary side coil 21*b* and magnetic sheet 52. Influence of magnets 30*a* and 30*b* will be described later.

While in this embodiment, primary side coil 21*a* is formed using a conductive wire having a circular cross section, it is also possible to use a conductive wire having a rectangular or polygonal cross section. When a conductive wire having a circular cross section is used, because a gap occurs between adjacent parts of the conductive wire, floating capacitance between the parts of the conductive wire becomes small, so that it is possible to suppress alternating-current resistance of primary side coil 21*a*.

Further, compared to a case where the conductive wire of primary side coil 21*a* is wound in two stages in a thickness direction, alternating-current resistance of primary side coil 21*a* becomes lower and transmission efficiency can increase when the conductive wire is wound in one stage. This is because, when the conductive wire is wound in two stages, floating capacitance occurs between the upper stage conductive wire and the lower stage conductive wire. Accordingly, it is preferable to wind the conductive wire in one stage in as large portion as possible rather than to wind the conductive wire in two stages in the whole primary side coil 21*a*. Further, by winding the conductive wire in one stage, it is possible to make primary side non-contact charging module 41 thinner. Further, when planar coil portion 2 includes two conductive wires, because the two conductive wires are electrically connected by a solder, or the like, at the portions of terminals 22*a* and 23*a*, the two conductive wires may be formed as if it were one thick conductive wire. The two conductive wires may be wound side by side in parallel to a coil surface or may be wound side by side vertically with respect to the coil surface. That is, when the conductive wires are wound in parallel to the coil surface, the two conductive wires are wound around the same central axis in a planar shape, and one conductive wire is put between the other conductive wires in a radial direction. By electrically bonding the two conductive wires at the portions of terminals 22*a* and 23*a* in this way so that the two conductive wires function as if it were one conductive wire, it is possible to suppress the thickness while maintaining the same cross-sectional area. That is, it is possible to obtain a cross-sectional area of a conductive wire having a diameter of 0.25 mm with two conductive wires having a diameter of 0.18 mm, for example. Accordingly, while if one conductive wire having a diameter of 0.25 mm is used, the thickness of one turn of primary side coil 21*a* is 0.25 mm and the width of primary side coil 21*a* in a radial direction is 0.25 mm, if two conductive wires having a diameter of 0.18 mm are used, the thickness of one turn of primary side coil 21*a* is 0.18 mm and the width in a radial direction is 0.36 mm. It should be noted that the thickness direction is a direction in which primary side coil 21*a* and magnetic sheet 51 are stacked. Further, the conductive wires are overlapped in two stages in the thickness direction at only part at the central side of primary side coil 21*a*, and the conductive wires may be formed in one stage at the remaining outer portion. Further, if the conductive wires are wound vertically with respect to the coil surface, while the thickness of primary side non-contact charging module 41 increases, because the cross-sectional area of the conductive wires virtually increases, it is possible to increase a current flowing through primary side coil 21*a* and to easily secure a sufficient number of turns. It should be noted that in this embodiment, primary side coil 21*a* includes conductive wires of approximately 0.18 to 0.4 mm, and among them, it is preferable to use a conductive wire of 0.25 to 0.35 mm for primary side coil 21*a* of primary side non-contact charging module 41.

Because the alternating-current resistance of primary side coil 21*a* is low, it is possible to prevent a loss at primary side coil 21*a*, and by increasing an L value, it is possible to improve power transmission efficiency of primary side non-contact charging module 41 which depends on the L value.

While terminals 22*a* and 23*a* may be provided close to each other or separate from each other, primary side non-contact charging module 41 can be easily mounted if terminals 22*a* and 23*a* are provided separate from each other.

Magnetic sheet 51 which is provided to improve power transmission efficiency of non-contact charging utilizing electromagnetic induction action, includes planar portion 31*a*, central portion 32*a* which is a center of coil 21, and linear recessed portion 33*a*. Further, if magnet 30*a* for positioning primary side non-contact charging module 41 and secondary side non-contact charging module 42 is provided, magnet 30*a* may be provided above central portion 32*a* or may be provided in place of central portion 32*a*.

Further, it is possible to use a Ni—Zn ferrite sheet, a Mn—Zn ferrite sheet, a Mg—Zn ferrite sheet, or the like as magnetic sheet 51. Magnetic sheet 51 may be formed as a single layer structure or as a structure in which a plurality of layers of the same material are laminated in a thickness direction, or may be formed by laminating a plurality of layers of different magnetic sheets 51 in the thickness direction. It is preferable to use magnetic sheet 51 having at least magnetic permeability of 250 or higher and saturation magnetic flux density of 350 mT or higher.

Further, it is possible to use an amorphous metal as magnetic sheet 51. When a ferrite sheet is used as magnetic sheet 51, the alternating-current resistance of primary side coil 21*a* is advantageously reduced, while, when an amorphous metal is used as the magnetic sheet, it is possible to make primary side coil 21*a* thinner.

Magnetic sheet 51 to be used for primary side non-contact charging module 41 has a size within approximately 50×50 mm, and has a thickness of approximately 3 mm or less. In this embodiment, magnetic sheet 51 is a substantially rectangle of approximately 20 mm×25 mm. It is preferable that magnetic sheet 51 is formed so as to have about the same size as or larger than the outer circumference end of primary side coil 21*a*. Further, the shape of magnetic sheet 51 may be a circle, a rectangle, a polygon, or a rectangle or a polygon having large curves at four corners.

Linear recessed portion 33*a* or slit 34*a* store the conductive wire from a coil winding start portion (innermost portion of the coil) to a terminal. By this means, it is possible to prevent the conductive wire from the coil winding start portion to the terminal from overlapping in the thickness direction of primary side coil 21*a* and suppress the thickness of primary side non-contact charging module 41. Further, by setting the size of linear recessed portion 33*a* or slit 34*a* to a minimum size which can store the conductive wire from the coil winding start portion to the terminal, it is possible to suppress occurrence of a leakage flux. Further, as shown in FIG. 3, linear recessed portion 33*a* or slit 34*a* does not have to be extended in parallel to a long side direction of primary side coil 21*a*, but may be parallel to a short side direction. Further, the cross-sectional shape of linear recessed portion 33*a* does not have to be a rectangle, but may be an arc or a round.

Linear recessed portion 33*a* or slit 34*a* is formed so as to be substantially perpendicular to an end of magnetic sheet 51 which intersects with an end of linear recessed portion 33*a* or slit 34*a*, and so as to overlap with an outline (sides of a substantially rectangular hollow portion) of the hollow portion. By forming linear recessed portion 33*a* or slit 34*a* in this way, it is possible to form terminals 22*a* and 23*a* without bending the conductive wire at the winding start portion. The length of linear recessed portion 33*a* or slit 34*a* depends on the size of the hollow portion of coil 21 and, in this embodiment, is approximately 5 mm to 15 mm.

Further, linear recessed portion 33*a* or slit 34*a* may be formed at a portion where the end of magnetic sheet 51 comes closest to the winding start portion of primary side coil 21*a* located at the end of the hollow portion. By this means, it is possible to minimize the area for forming linear recessed portion 33*a* or slit 34*a* and improve transmission efficiency of the non-contact power transmission device. In this case, the length of linear recessed portion 33*a* or slit 34*a* is approximately 5 mm to 10 mm. An inner end of linear recessed portion 33*a* or slit 34*a* is connected to central portion 32*a* for either arrangement.

Further, linear recessed portion 33*a* or slit 34*a* may be arranged in other manners. That is, because it is preferable to form primary side coil 21*a* to have a single stage structure, it is conceivable to adopt an arrangement where all the turns in a radial direction of primary side coil 21*a* are formed in one stage structure, or an arrangement where part of the turns is formed in a single stage structure and the other part is formed in a two-stage structure. Accordingly, while it is possible to draw one of terminals 22*a* and 23*a* from an outer periphery of primary side coil 21*a*, the other terminal has to be drawn from the inside. If a portion where primary side coil 21*a* is wound certainly overlaps with a portion from winding end of primary side coil 21*a* to terminal 22*a* or 23*a* in a thickness direction, linear recessed portion 33*a* or slit 34*a* may be provided at the overlapped portion.

If linear recessed portion 33*a* is used, because a through hole or a slit is not provided at magnetic sheet 51, it is possible to prevent leakage of a magnetic flux and improve power transmission efficiency of primary side non-contact charging module 41. Meanwhile, when slit 34*a* is used, magnetic sheet 51 can be easily formed. If linear recessed portion 33*a* is used, the cross-sectional shape is not limited to a rectangle, but may be an arc or a round.

Then, an influence of a magnet on primary side non-contact charging module 41 and secondary side non-contact charging module 42 which will be described later will be described. Secondary side coil 21*b* inside secondary side non-contact charging module 42 receives a magnetic field generated by primary side non-contact charging module 41 to perform power transmission. If a magnet is arranged around primary side coil 21*a* and secondary side coil 21*b*, the magnetic field may be generated while avoiding the magnet or the magnetic field which tries to pass through the magnet may disappear. Further, magnetic permeability at a portion close to the magnet of magnetic sheet 51 is reduced. That is, the magnetic field is weakened by the magnet. Accordingly, in order to minimize the magnetic field weakened by the magnet, it is necessary to take some measures such as separating primary side coil 21*a* and secondary side coil 21*b* and the magnet or providing magnetic sheet 51 which is less likely to be influenced by the magnet.

Because primary side non-contact charging module 41 is used at a fixed terminal which is a power supply transmission side, there is extra space which can be occupied by primary side non-contact charging module 41 in the fixed terminal. Further, because a current flowing through primary side coil 21*a* of primary side non-contact charging module 41 is large, insulation property of magnetic sheet 51 is important. If magnetic sheet 51 is a conductive sheet, a large current flowing through primary side coil 21*a* may be transmitted to other parts via magnetic sheet 51.

In consideration of the above, magnetic sheet 51 mounted on primary side non-contact charging module 41 is preferably a (insulation) Ni—Zn ferrite sheet having a thickness of 400 μm or greater (preferably, 600 μm to 1 mm), magnetic characteristic of magnetic permeability of 250 or higher, and saturation magnetic flux density of 350 mT or higher. However, it is also possible to use a (conductive) Mn—Zn ferrite sheet if being subject to sufficient insulation processing, in place of the Ni—Zn ferrite sheet.

Further, in primary side non-contact charging module 41, the L value of primary side coil 21*a* of primary side non-contact charging module 41 largely varies between a case where magnet 30*a* is used for positioning and a case where magnet 30*a* is not used. That is, the presence of magnet 30*a* in primary side non-contact charging module 41 or the presence of a similar magnet in secondary side non-contact charging module 42 inhibits the magnetic flux between the primary side and the secondary side non-contact charging modules, and largely reduces the L value of primary side coil 21*a* of primary side non-contact charging module 41 by the presence of the magnet. In order to suppress the influence of this magnet 30*a*, magnetic sheet 51 is preferably formed with a high saturation magnetic flux density material (having saturation magnetic flux density of 350 mT or higher). Because the high saturation magnetic flux density material has property that a magnetic flux is less likely to be saturated even if the magnetic field becomes strong, it is possible to reduce influence of magnet 30*a* and improve the L value of coil 21 when magnet 30*a* is used. Accordingly, it is possible to make magnetic sheet 51 thinner.

However, if the magnetic permeability of magnetic sheet 51 becomes too low, the L value of primary side coil 21*a* is significantly lowered. As a result, the efficiency of primary side non-contact charging module 41 may be degraded. Accordingly, the magnetic permeability of magnetic sheet 51 is preferably at least 250 or higher, more preferably, 350 or higher. Further, while the L value also depends on the thickness of magnetic sheet 51, the thickness of the ferrite sheet may be 400 μm or greater. While the ferrite sheet can reduce the alternating-current resistance of coil 21 compared to the magnetic sheet of the amorphous metal, it is also possible to use the amorphous metal. By using such magnetic sheet 51, even if at least one of primary side non-contact charging module 41 and secondary side non-contact charging module 42 includes a magnet, primary side non-contact charging module 41 can reduce the influence of the magnet.

Further, by using the Mn—Zn ferrite sheet as the ferrite sheet, it is possible to make magnetic sheet 51 even further thinner. That is, a frequency of electromagnetic induction is defined by the standards (WPC) to be approximately 100 kHz to 200 kHz (for example, 120 kHz). In such a low frequency band, the Mn—Zn ferrite sheet exhibits high efficiency. The Ni—Zn ferrite sheet exhibits high efficiency in high frequency.

[Regarding a Mobile Terminal and a Secondary Side Non-Contact Charging Module]

A case where secondary side non-contact charging module 42 is mounted on a mobile terminal device will be described.

Figure 5:
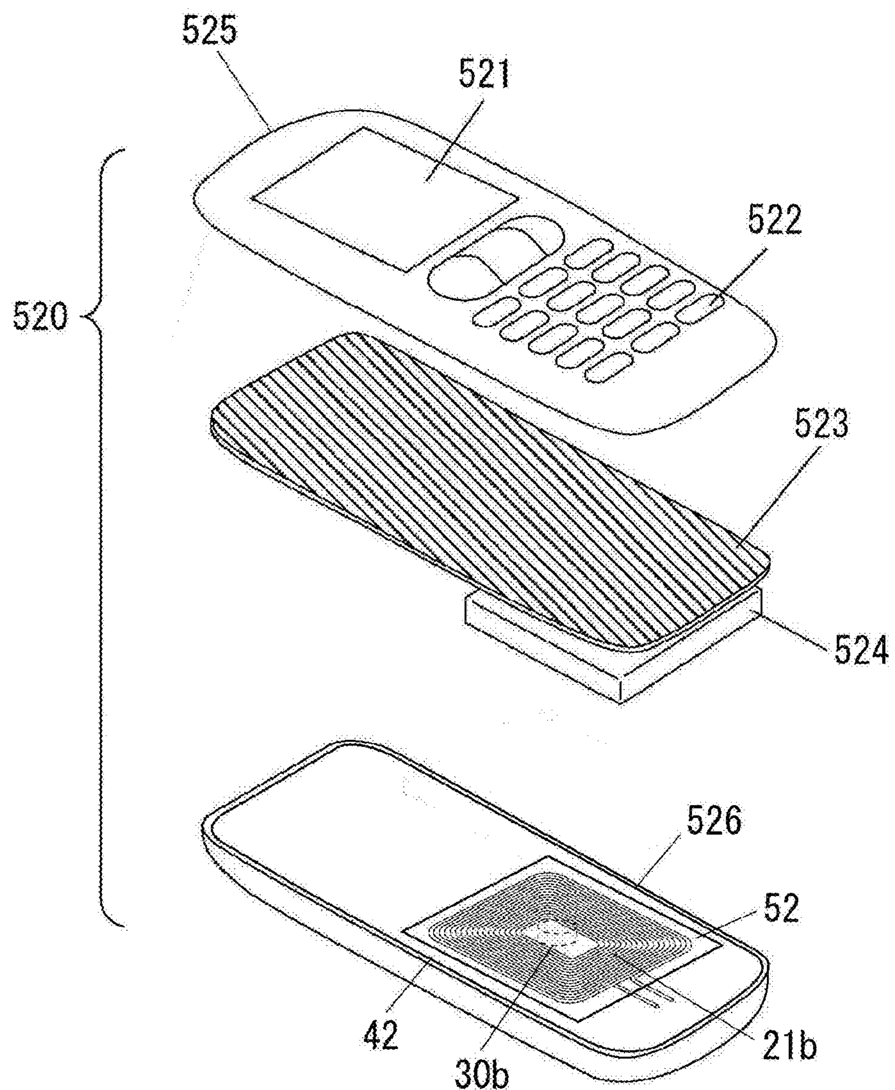
FIG. 5 illustrates a configuration of a mobile terminal device according to the embodiment of the present invention.

FIG. 5 illustrates a configuration of a mobile terminal device according to the embodiment of the present invention, and is a perspective view which illustrates a decomposed mobile terminal device.

Mobile terminal device 520 is composed of liquid crystal panel 521, operation button 522, substrate 523, battery pack 524, and the like. Mobile terminal device 520 which receives power by utilizing electromagnetic induction action has secondary side non-contact charging module 42 inside chassis 525 and chassis 526 which form its exterior.

At a back surface of chassis 525 on which liquid crystal panel 521 and operation button 522 are provided, substrate 523 including a controlling section which receives information input from operation button 522, displays necessary information on liquid crystal panel 521 and controls the whole of mobile terminal device 520 is provided. Further, at a back surface of substrate 523, battery pack 524 is provided. Battery pack 524 is connected to substrate 523 and supplies power to substrate 523.

Further, at a back surface of battery pack 524, that is, at the side of chassis 526, secondary side non-contact charging module 42 is provided. Secondary side non-contact charging module 42 receives power supply from primary side non-contact charging module 41 by the action of electromagnetic induction and charges battery pack 524 by utilizing the power.

Secondary side non-contact charging module 42 includes secondary side coil 21*b*, magnetic sheet 52, and the like. When power supply is assumed to be received from the side of chassis 526, by arranging secondary side coil 21*b* and magnetic sheet 52 in this order from the side of chassis 526, it is possible to receive power supply while reducing the influence of substrate 523 and battery pack 524.

Further, secondary side non-contact charging module 42 may have magnet 30*b* to be used for performing positioning with primary side non-contact charging module 41. In this case, magnet 30*b* is provided at a hollow portion positioned in a central area of secondary side coil 21*b*. It is defined by the standards (WPC) that magnet 30*b* should be a circle and should have a diameter of 15.5 mm or less, for example. Magnet 30*b* has a coin shape and has to be arranged so that its center matches a central winding axis of primary side coil 21*a* in order to reduce the influence of magnet 30*a* on primary side coil 21*a*. Magnet 30*b* provided at secondary side non-contact charging module 42 reduces the L values of both primary side coil 21*a* and secondary side coil 21*b*.

When secondary side non-contact charging module 42 has magnet 30*b*, as the first method for arranging magnet 30*b*, there is a method in which magnet 30*b* is arranged on an upper surface of central portion 32*b* of magnetic sheet 52. Further, as the second method for arranging magnet 30*b*, there is a method in which magnet 30*b* is arranged in place of central portion 32*b* of magnetic sheet 52. In the second method, because magnet 30*b* is arranged in a hollow area of secondary side coil 21*b*, it is possible to make secondary side non-contact charging module 42 smaller.

When a magnet is not utilized for positioning primary side non-contact charging module 41 and secondary side non-contact charging module 42, magnet 30*b* is not required.

Secondary side non-contact charging module 42 will be described.

Figure 6:
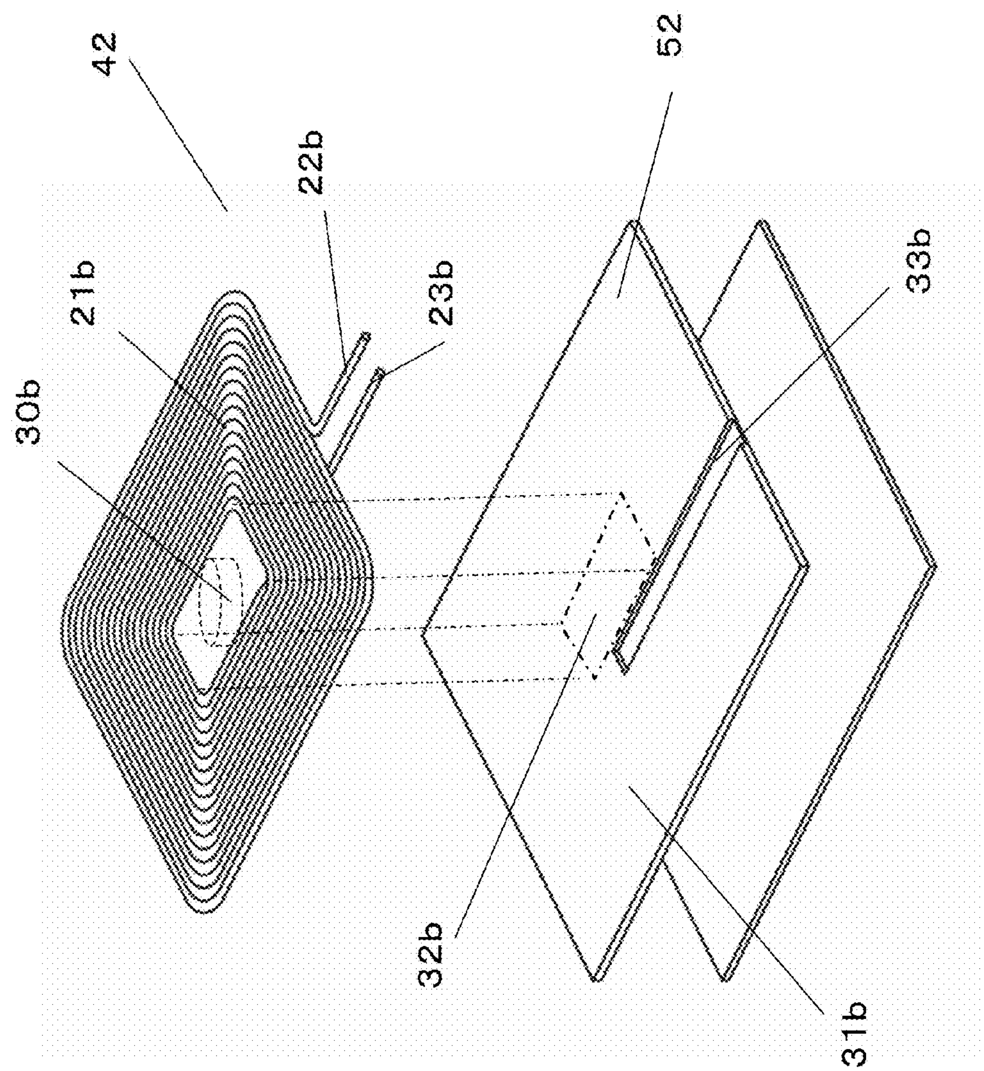
FIG. 6 illustrates a secondary side non-contact charging module according to the embodiment of the present invention.

FIG. 6 illustrates a secondary side non-contact charging module according to the embodiment of the present invention and illustrates a case where a secondary side coil is a circular coil.

FIGS. 7A to 7D illustrate in detail a secondary side non-contact charging module according to the embodiment of the present invention. FIGS. 7A to 7D illustrate an upper surface of the secondary side non-contact charging module, FIG. 7B is a cross-sectional view of C-C of the secondary side non-contact charging module in FIG. 7A, FIG. 7C is a cross-sectional view of D-D of the secondary side non-contact charging module in FIG. 7A when a linear recessed portion is provided, and FIG. 7D is a cross-sectional view of D-D of the secondary side non-contact charging module in FIG. 7A when a slit is provided. It should be noted that FIG. 7A and FIG. 7B illustrate a case where magnet 30*b* is not provided. If a magnet is provided, magnet 30*b* indicated by the dotted line is provided.

FIG. 6 and FIGS. 7A to 7D which illustrate secondary side non-contact charging module 42 respectively correspond to FIG. 3 and FIGS. 4A to 4D which illustrate primary side non-contact charging module 41. The configuration of secondary side non-contact charging module 42 is basically substantially the same as that of primary side non-contact charging module 41.

Secondary side non-contact charging module 42 differs from primary side non-contact charging module 41 in the size and material of magnetic sheet 52. Magnetic sheet 52 to be used in secondary side non-contact charging module 42 has a size within approximately 40×40 mm and has a thickness of approximately 2 mm or less.

The size of magnetic sheet 51 to be used in primary side non-contact charging module 41 differs from the size of magnetic sheet 52 to be used in secondary side non-contact charging module 42 because secondary side non-contact charging module 42 is typically mounted on a portable electronic device, and therefore requires to be smaller. In this embodiment, magnetic sheet 52 is a substantially rectangle of approximately 20 mm×25 mm. Magnetic sheet 52 is preferably formed to have about the same size as or to be larger than an outer periphery end of secondary side coil 21*b*. Further, the shape of magnetic sheet 52 may be a circle, a rectangle, a polygon, or a rectangle or a polygon having large curves at four corners.

Further, because secondary side non-contact charging module 42 is used at a mobile terminal which is power supply reception side, there is no extra space which can be occupied by secondary side non-contact charging module 42 in the mobile terminal. Further, because a current flowing through secondary side coil 21*b* of secondary side non-contact charging module 42 is small, high insulation of magnetic sheet 52 is not required. In this embodiment, secondary side coil 21*b* includes a conductive wire of approximately 0.18 to 0.35 mm, and among them, secondary side coil 21*b* of secondary side non-contact charging module 42 preferably includes a conductive wire of approximately 0.18 to 0.30 mm.

If secondary side non-contact charging module 42 is mounted on a mobile phone, secondary side non-contact charging module 42 is often arranged between a casing that forms the exterior of the mobile phone and a battery pack positioned inside the case. Typically, the battery pack which is an aluminum chassis, negatively affects on power transmission because the magnetic flux of the coil is weakened due to occurrence of an eddy current generated in aluminum in a direction which weakens the magnetic flux generated by the coil. Therefore, it is necessary to provide magnetic sheet 52 between aluminum which is the exterior of the battery pack and secondary side coil 21*b* arranged on the exterior to reduce influence on the aluminum.

Taking into account the above, it is important to use magnetic sheet 52 having high magnetic permeability and high saturation magnetic flux density in secondary side non-contact charging module 42 to increase the L value of secondary side coil 21*b* as high as possible. Basically, as with magnetic sheet 51, magnetic sheet 52 may have magnetic permeability of 250 or higher and saturation magnetic flux density of 350 mT or higher. In this embodiment, magnetic sheet 52 is preferably a Mn—Zn ferrite sintered compact having magnetic permeability of 1,500 or higher, saturation magnetic flux density of 400 or higher, and a thickness of approximately 400 μm or greater. However, it is also possible to use a Ni—Zn ferrite, and with magnetic permeability of 250 or higher and saturation magnetic flux density of 350 or higher, it is possible to transmit power with primary side non-contact charging module 41. Further, secondary side coil 21*b* is also wound in a substantially rectangular shape as with primary side coil 21*a*. There is a case where magnet 30*a* is provided inside primary side non-contact charging module 41 to perform positioning and a case where positioning is performed without magnet 30*a* being provided. When a magnet is provided at primary side non-contact charging module 41, the diameter of circular magnet 30*a* is 15.5 mm or less, and in this embodiment, 15.5 mm.

A relationship between the size of magnet 30*a* and the size of a hollow portion of secondary side coil 21*b* will be described. While a case where magnet 30*a* is provided at primary side non-contact charging module 41 will be described here, the relationship is the same as a case where magnet 30*b* is provided at secondary side non-contact charging module 42, in which case, in the following description, magnet 30*b* corresponds to magnet 30*a*, and primary side non-contact charging module 41 corresponds to secondary side non-contact charging module 42.

In addition, there is, for example, the following methods for positioning primary side non-contact charging module 41 and secondary side non-contact charging module 42. For example, there is a method in which the non-contact charging modules are physically (as a shape) and forcibly positioned by forming a protruding portion on a charging surface of a charger and forming a recessed portion on a secondary side electronic device and fitting the protruding portion into the recessed portion. There is still another method in which the non-contact charging modules are positioned by mounting a magnet on at least one of the primary and secondary side non-contact charging modules and by the magnets provided at the both non-contact charging modules or the magnet provided at one non-contact charging module and a magnetic sheet provided at the other non-contact charging module being attracted by each other. There is yet another method in which the primary side non-contact charging module detects a position of a coil of the secondary side non-contact charging module to thereby automatically move a coil of the primary side non-contact charging module to the position of the coil of the secondary side non-contact charging module. There is still another method in which a large number of coils are provided at a charger to thereby enable charging even if a mobile device is placed on anywhere on a charging surface of the charger.

While, as described above, there are various methods for positioning coils of primary side (charging side) non-contact charging module 41 and secondary side (charged side) non-contact charging module 42, these methods can be divided into a method in which a magnet is used and a method in which a magnet is not used. By making primary side (charging side) non-contact charging module 41 applicable to both secondary side (charged side) non-contact charging module 42 in which a magnet is used and secondary side (charged side) non-contact charging module 42 in which a magnet is not used, it is possible to perform charging regardless of types of the secondary side (charged side) non-contact charging module, so that convenience can be improved. In a similar manner, by making the secondary side (charged side) non-contact charging module applicable to both the primary side (charging side) non-contact charging module in which a magnet is used and the primary side (charging side) non-contact charging module in which a magnet is not used, it is possible to perform charging regardless of types of the primary side (charging side) non-contact charging module, so that convenience can be improved. That is, it is necessary to configure the non-contact charging module which performs power transmission with the other non-contact charging module which is a counterpart of power transmission using electromagnetic induction, so as to be able to perform positioning with the other non-contact charging module and to perform power transmission using both of first means in which a magnet provided at the other non-contact charging module is utilized to perform positioning and second means in which positioning is performed without utilizing a magnet.

If magnet 30*a* exists near secondary side non-contact charging module 42 in order to perform positioning, magnetic permeability of magnetic sheet 52 is lowered. The magnetic permeability of magnetic sheet 52 becomes the lowest at a portion close to magnet 30*a* (typically, near central portion 32*b*), and a lowering rate of the magnetic permeability is reduced (the magnetic permeability becomes less likely to be lowered) in accordance with an increase in distance from magnet 30*a*. If the magnetic permeability of magnetic sheet 52 decreases, the L value of secondary side coil 21*b* is lowered. Accordingly, by increasing a distance between secondary side coil 21*b* and magnet 30*a*, it is possible to suppress decrease of the L value. Meanwhile, in order to make the non-contact charging modules smaller, it is difficult to increase the distance between secondary side coil 21*b* and magnet 30*a*. This will be described in detail below.

Figure 8A:
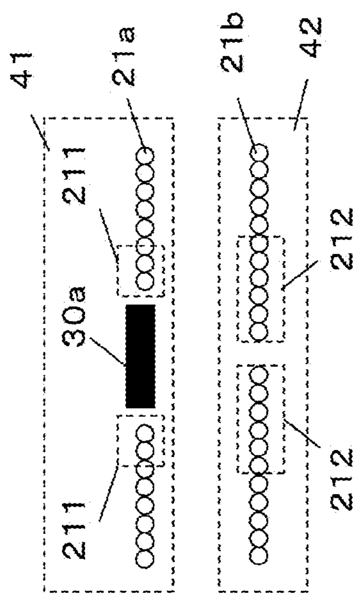
FIGS. 8A to 8D illustrate a relationship between the primary side non-contact charging module provided with a magnet and the secondary side non-contact charging module.
Figure 8B:
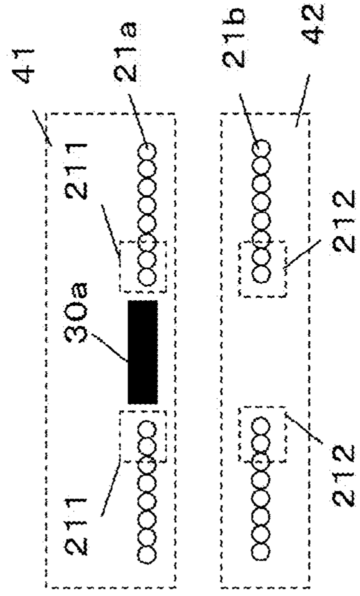
Figure 8C:
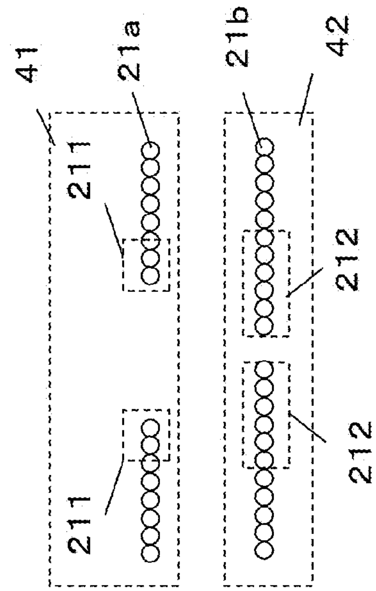
Figure 8D:
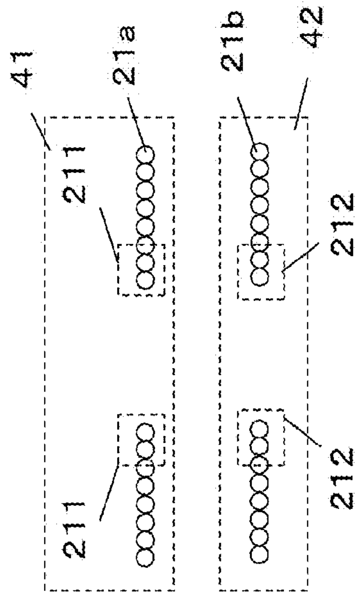
Figure 9:
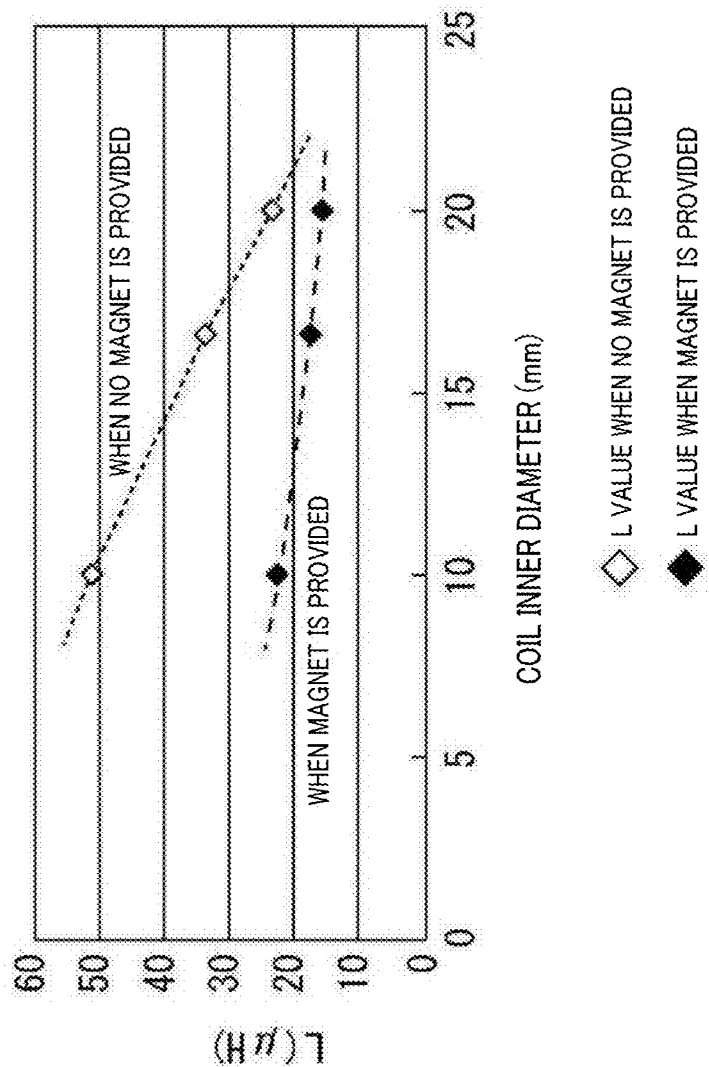
FIG. 9 illustrates a relationship between a coil inner diameter and an L value of the coil.

FIGS. 8A to 8D illustrate a relationship between a primary side non-contact charging module provided with a magnet and a secondary side non-contact charging module. FIG. 8A illustrates a case where a magnet for performing positioning is used when an inner width of a coil is small, FIG. 8B illustrates a case where a magnet for positioning is used when the inner width of the coil is large, FIG. 8C illustrates a case where a magnet for positioning is not used when the inner width of the coil is small, and FIG. 8D illustrates a case where a magnet for positioning is not used when the inner width of the coil is large. FIG. 9 illustrates a relationship between a coil inner diameter and the L value of the coil. FIGS. 8A to 8D illustrate primary side non-contact charging module 41 provided with magnet 30*a* and secondary side coil 21*b* of secondary side non-contact charging module 42 which performs power transmission. It should be noted that the description of secondary side coil 21*b* of secondary side non-contact charging module 42 which will be described below can be also applied to primary side coil 21*a* of primary side non-contact charging module 41 which performs power transmission with secondary side non-contact charging module 42 provided with magnet 30*b*.

Primary side coil 21*a* faces secondary side coil 21*b*. In primary side coil 21*a* and secondary side coil 21*b*, a magnetic field is also generated in inner portions 211 and 212, and power is transmitted. Inner portions 211 and 212 face each other. Further, inner portions 211 and 212 are close to magnet 30*a*, and therefore are likely to be negatively affected by magnet 30*a*. That is, when a magnetic flux is generated between the primary side coil and the secondary side coil to perform power transmission, if a magnet exists between or around the primary side coil and the secondary side coil, the magnetic flux extends while avoiding the magnet. Alternatively, a magnetic flux which penetrates inside the magnet causes an eddy current or heat inside the magnet, which becomes a loss. Further, as a result of the magnet being arranged near the magnetic sheet, the magnetic permeability of the magnetic sheet near the magnet is lowered. Accordingly, magnet 30*a* provided at primary side non-contact charging module 41 weakens the magnetic flux of primary side coil 21*a* and secondary side coil 21*b*, particularly, at inner portions 211 and 212, which causes a negative effect. As a result, transmission efficiency between the non-contact charging modules is lowered. Therefore, in a case of FIG. 8A, inner portions 211 and 212 which are likely to be negatively affected by magnet 30*a* become large. Meanwhile, in FIG. 8C in which a magnet is not used, because the number of turns of secondary side coil 21*b* is large, an L value becomes great. As a result, because a lowering rate from the L value in FIG. 8C to the L value in FIG. 8A is considerably high, in the coil having a small inner width, a lowering rate of the L value from a case where magnet 30*a* is provided for positioning to a case where magnet 30*a* is not provided becomes considerably high. Further, if the inner width of secondary side coil 21*b* is smaller than a diameter of magnet 30*a* as shown in FIG. 8A, secondary side coil 21*b* is directly negatively affected by magnet 30*a* by an amount corresponding to an area where secondary side coil 21*b* faces magnet 30*a*. Accordingly, the inner width of secondary side coil 21*b* is preferably separate from magnet 30*a* as far as possible.

Meanwhile, if the inner width of the coil is large as shown in FIG. 8B, inner portions 211 and 212 which are likely to be negatively affected by magnet 30*a* become very small. Further, in a case of FIG. 8D where a magnet is not used, because the number of turns of secondary side coil 21*b* becomes small, the L value becomes smaller than the case of FIG. 8C. As a result, because a lowering rate from the L value in the case of FIG. 8D to the L value in the case of FIG. 8B becomes small, it is possible to suppress the lowering rate of the L value in the coil having a large inner width. Further, because an end of the hollow portion of coil 21 is separate from magnet 30*a* in accordance with an increase in inner width of secondary side coil 21*b*, it is possible to suppress the influence of magnet 30*a*. However, because the non-contact charging module is mounted on a charger, electronic device, or the like, it is necessary to make the non-contact charging module smaller and it is impossible to form the non-contact charging module having a predetermined size or larger. Therefore, in order to reduce a negative effect of magnet 30*a* by increasing the inner widths of primary side coil 21*a* and secondary side coil 21*b*, the number of turns is reduced and the L value becomes small regardless of the presence or absence of a magnet.

Further, as shown in FIG. 9, when the size of magnet 30*a* and the outer diameter of secondary side coil 21*b* are fixed (30 mm), if the number of turns of secondary side coil 21*b* is reduced and an inner diameter of secondary side coil 21*b* is increased, the influence of magnet 30*a* on secondary side coil 21*b* becomes small. That is, the L value of secondary side coil 21*b* in a case where magnet 30*a* is utilized to position primary side non-contact charging module 41 and secondary side non-contact charging module 42 becomes close to the L value in a case where magnet 30*a* is not utilized. Accordingly, the resonant frequency in a case where magnet 30*a* is used becomes very close to the resonant frequency in a case where magnet 30*a* is not used. The result of FIG. 9 can be also applied to the L value of primary side coil 21*a* of primary side non-contact charging module 41 when magnet 30*b* is provided at secondary side non-contact charging module 42.

As described above, the present invention employs a configuration such that a substantially rectangular hollow portion of secondary side coil 21*b* has a short side shorter than a diameter of the aforementioned circular magnet and a long side longer than the diameter of the aforementioned circular magnet. That is, because the diameter of magnet 30*a* is 15.5 mm at a maximum, the long side is preferably longer than 15.5 mm. By this means, even if the short side is shorter than 15.5 mm, it is possible to provide an effect of the present invention to any magnet. This will be described in detail using FIGS. 10A and 10B.

Figures 10A, 10B:
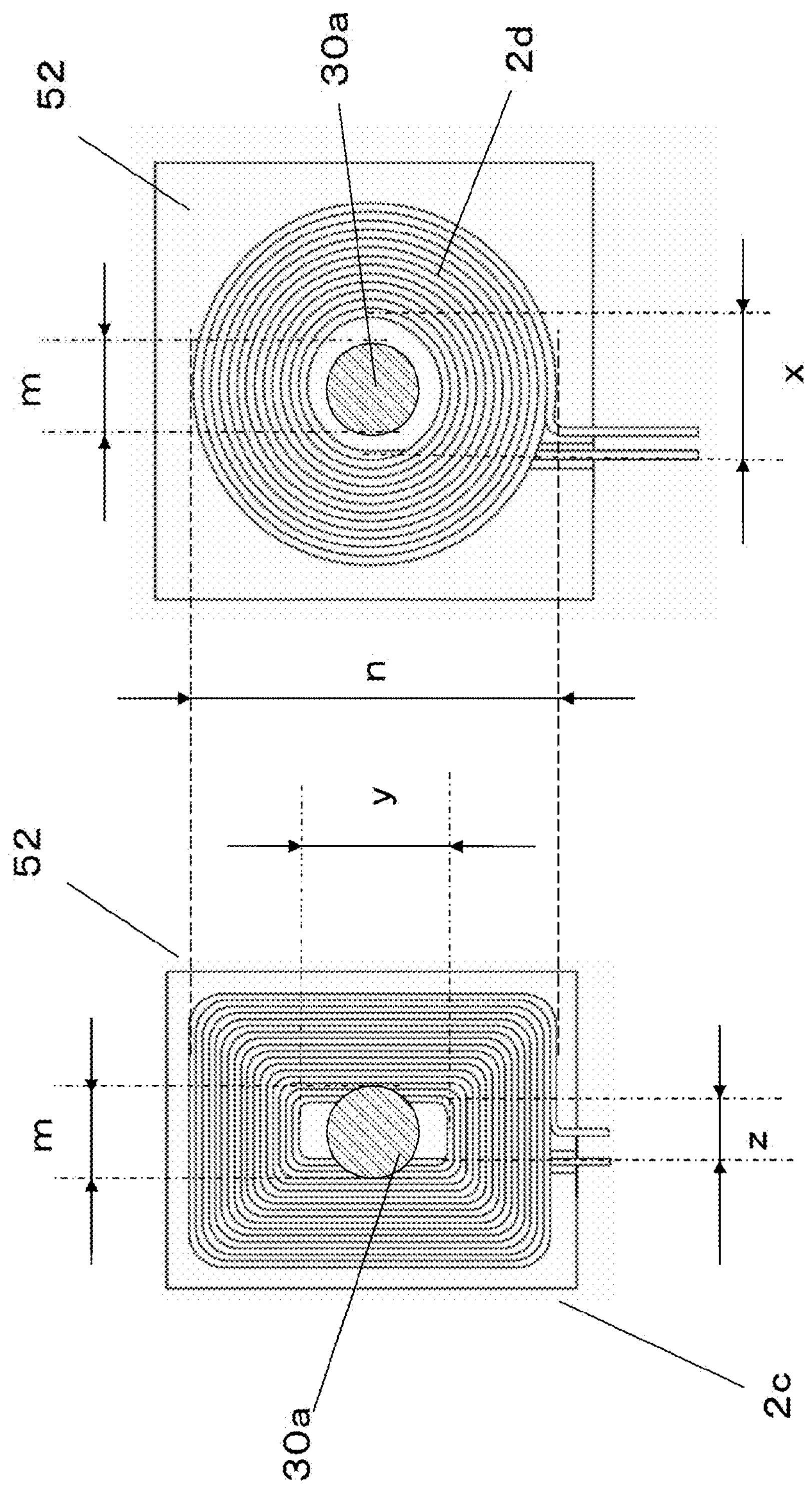
FIGS. 10A and 10B illustrate a positional relationship between a secondary side coil wound in a rectangular shape and a secondary side coil wound in a circular shape, and a magnet provided at the primary side non-contact charging module.
Figure 11:
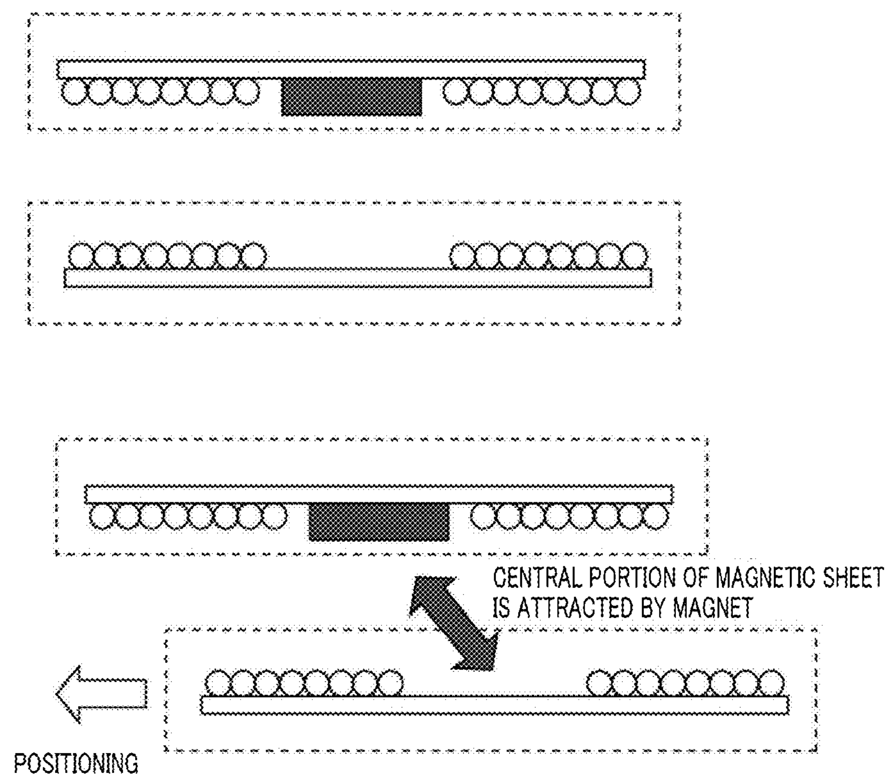
FIG. 11 illustrates a non-contact charging module (for example, the secondary side non-contact charging module) brought into position using a magnet provided at the other non-contact charging module (for example, the primary side non-contact charging module).

FIGS. 10A and 10B illustrate a relationship between a secondary side coil wound in a rectangular shape and a secondary side coil wound in a circular shape and a magnet provided at a primary side non-contact charging module. FIG. 10A illustrates a case where the secondary side coil is wound in a rectangular shape, and FIG. 10B illustrates a case where the secondary side coil is wound in a circular shape. It should be noted that in FIGS. 10A and 10B, the length of an outer long side of the rectangular coil shown in FIG. 10A is equal to a diameter of an outer diameter of the circular coil shown in FIG. 10B, and both are n, and an inner long side y of the rectangular coil is equal to a diameter x of an inner circle of the circular coil. Further, an inner short side of the rectangular coil is z. Naturally, $x>z$, and $y>z$. It should be noted that in this case, a coil is secondary side coil 21*b* provided at secondary side non-contact charging module 42. In order to sufficiently secure a distance between an inner circle (outer periphery of the hollow portion) of circular coil 2*d* and magnet 30*a*, it is necessary to set x greater than m. As a result, a height and a width of the circular coil are n in any direction. Further, a distance between the inner circle (outer periphery of the hollow portion) of circular coil 2*d* and magnet 30*a* is (x−m)/2 at any angle in FIG. 10B. That is, the distance between the inner circle (outer periphery of the hollow portion) of circular coil 2*d* and magnet 30*a* is (x−m)/2 at a maximum and at a minimum.

Meanwhile, in rectangular coil 2*c* shown in FIG. 10A, part of a long side portion overlaps with magnet 30*a*. That is, $z<m$. However, corner portions (four corners) and a short side portion of rectangular coil 2*c* do not overlap with magnet 30*a* ($y>m$). Further, because a diagonal of the rectangle is greater than y, a distance from magnet 30*a* to the corner portions is greater than (x−m)/2. Further, in the case of the rectangular coil, the magnetic flux concentrates on the corner portions, because if the coil is wound so as to form a corner, a magnetic flux concentrates on the corner portion. Further, when the coil is wound in a rectangular shape, a magnetic flux concentrates on the short side rather than the long side. The shortest distance between the short side of rectangular coil 2*c* in FIG. 10A and magnet 30*a* is (x−m)/2, and portions other than a center of the short side is further separate from magnet 30*a*.

That is, even if part of the long side portion of rectangular coil 2*c* in FIG. 10A overlaps with magnet 30*a*, the corner portions on which the magnetic flux concentrates most are separate from magnet 30*a*, and a distance between the corner portions and magnet 30*a* is greater than (x−m)/2. Further, a distance between the short side and magnet 30*a* is (x−m)/2 or greater. By this means, while rectangular coil 2*c* in FIG. 10A realizes a smaller size compared with circular coil 2*d* in FIG. 10B, rectangular coil 2*c* can perform power transmission with the same efficiency as that of the circular coil.

It should be noted that the substantially rectangular coil includes a coil wound so that four corners are curved, instead of right angled. At this time, it is only necessary to set each of the curved shapes at four corners at 30% or less of a corresponding one of the sides of the hollow portion. For example, if the rectangular hollow portion is 12 mm×18 mm, it is only necessary to set each of the curves of the hollow portion to be 3.6 mm or less at both sides of the short side and 5.4 mm or less at both sides of the long side. The outer shape (outer edge shape) of the coil varies according to the shape of the hollow portion. If each curved shape of the four corners is 30% or greater of a corresponding side of the hollow portion, the rectangular shape becomes an elliptic shape. If the coil has an elliptic shape, a phenomenon that the magnetic field concentrates on the corners is weakened, and the corners come close to magnet 30*a*. Accordingly, the curved shape of the four corners is set at 30% or less.

In the non-contact charging module in FIG. 10A, when a magnet is provided at the non-contact charging module which is a power transmission counterpart, the L value is approximately 9.2 μH, and when a magnet is not provided, the L value is approximately 26.4 μH, and the lowering rate of the L value is approximately 65%. Meanwhile, in the non-contact charging module in FIG. 10B, when a magnet is provided at the non-contact charging module which is a power transmission counterpart, the L value is approximately 9.7 μH, when a magnet is not provided, the L value is approximately 27.6 μH, and the lowering rate of the L value is approximately 65%. That is, the non-contact charging modules shown in FIG. 10A and FIG. 10B exhibit almost the same L value and lowering rate of the L value.

Accordingly, the substantially rectangular coil in FIG. 10A can reduce the area of the coil by approximately 15% while realizing almost the same property as the circular coil in FIG. 10B. Further, when magnetic sheet 52 is mounted on a mobile terminal as shown in FIGS. 10A and 10B, a substantially rectangular magnetic sheet is often used taking into account an arrangement of other parts, and magnetic sheet 52 in FIG. 10A reduces an area of magnetic sheet 52 by approximately 30% or greater compared to magnetic sheet 52 in FIG. 10B.

If the coil is formed to have a substantially square hollow portion of 18 mm×18 mm, the lowering rate of the L value becomes considerably low and approximately 56%, so that it is possible to form the non-contact charging module having more favorable power transmission efficiency. However, it is impossible to realize a smaller non-contact charging module with such a coil having the substantially square hollow portion.

By providing secondary side coil 21*b* in which a conductive wire is wound in a substantially rectangular shape and magnetic sheet 52 provided with a surface on which secondary side coil 21*b* is placed and by making the short side of the substantially rectangular hollow portion of secondary side coil 21*b* shorter than the diameter of circular magnet 30*a*, and by making the long side longer than the diameter of circular magnet 30*a* as in the present invention, it is possible to realize smaller secondary side non-contact charging module 42 which can suppress variation of the L value of secondary side coil 21*b* provided at secondary side non-contact charging module 42 when primary side non-contact charging module 41 and secondary side non-contact charging module 42 are positioned, in both of a case where magnet 30*a* provided at primary side non-contact charging module 41 which is a power transmission counterpart is used and a case where magnet 30*a* is not used, and which can be suitably used in both of a case where magnet 30*a* is used and a case where magnet 30*a* is not used. Naturally, technique and effects of secondary side non-contact charging module 42 and magnet 30*a* can be also applied to primary side non-contact charging module 41 and magnet 30*b*.

While the long side of the hollow portion overlaps with the magnet in this way, the outer shape of the coil is preferably larger than the magnet. By this means, because there is a portion where the coil does not overlap with the magnet even in a long side portion of the coil, it is possible to reduce influence of the magnet. It should be noted that the lowering rate of the L value indicates a rate of the L value in a case where a magnet is used for positioning at the non-contact charging module which is a power transmission counterpart with respect to the L value in a case where a magnet is not used. That is, as the lowering rate of the L value is smaller, it is less likely to receive influence of the magnet, and the L value in a case where the magnet is used becomes close to the L value in a case where the magnet is not used. Further, the non-contact charging device is an electronic device which is provided with a non-contact charging module, and includes various electronic devices such as a charger provided with the primary side non-contact charging module, and a mobile terminal or an electronic device, provided with the secondary side non-contact charging module.

The disclosure of Japanese Patent Application No. 2011-195819, filed on Sep. 8, 2011, including the specification, drawings, and abstract, is incorporated herein by reference in its entirety.

INDUSTRIAL APPLICABILITY

According to the non-contact charging module, electronic device and non-contact charging device of the present invention, it is possible to realize smaller non-contact charging module, electronic device and non-contact charger which can realize high efficiency and stable power transmission efficiency. Thus, the present invention is suitable for use as a transmission side charging device for charging a mobile device such as a mobile phone, a portable audio, a mobile terminal such as a mobile computer, a digital camera and a video camera.

REFERENCE SIGNS LIST

21*a* Primary side coil
21*b* Secondary side coil
211, 212 Inner portion
22*a*, 23*a* Terminal (primary side)
22*b*, 23*b* Terminal (secondary side)
30*a* Magnet (primary side)
30*b* Magnet (secondary side)
31*a* Flat portion (primary side)
31*b* Flat portion (secondary side)
32*a* Central portion (primary side)
32*b* Central portion (secondary side)
33*a* Linear recessed portion (primary side)
33*b* Linear recessed portion (secondary side)
34*a* Slit (primary side)
34*b* Slit (secondary side)
41 Primary side non-contact charging module (transmission side non-contact charging module)
42 Secondary side non-contact charging module (reception side non-contact charging module)
51 Magnetic sheet (primary side)
52 Magnetic sheet (secondary side)
71 Power input section
72 Rectifier circuit
82 Power output section
200 Electronic device
300 Commercial power source
301 Outlet
400 Non-contact charger
401 Plug
402 Surface
5010*n* table
520 Mobile terminal device
521 Liquid crystal panel
522 Operation button
523 Substrate
524 Battery pack (power holding section)
525, 526 Chassis

The invention claimed is:

1. A first non-contact charging module configured to perform power transmission with a second non-contact charging module by electromagnetic induction and configured to be positioned with the second non-contact charging module using a circular magnet or without using the circular magnet for positioning, the circular magnet being provided at the second non-contact charging module, the first non-contact charging module comprising:

a planar coil portion including a conductive wire wound in a rectangular shape; and a magnetic sheet provided with a surface on which the planar coil portion is placed, wherein the planar coil portion includes a rectangular-shaped hollow portion that has a plurality of short sides shorter than a diameter of the circular magnet and a plurality of long sides longer than the diameter of the circular magnet, the rectangular-shaped hollow portion of the planar coil portion has an outline in which every short side and long side of the outline is longer than the diameter of the circular magnet, and the circular magnet is positioned on top of the planar coil portion.

2. A first non-contact charging device comprising the non-contact charging module according to claim 1.

3. The first non-contact charging module according to claim 1, wherein the rectangular-shaped hollow portion includes a plurality of corner portions, and the circular magnet does not overlap with either the plurality of short sides of the rectangular-shaped hollow portion or the plurality of corner portions of the rectangular-shaped hollow portion.

4. A first non-contact charging module configured to perform power transmission with a second non-contact charging module by electromagnetic induction and to be positioned with the second non-contact charging module using a circular magnet or without using the circular magnet for positioning, the circular magnet having a diameter of 15.5 mm at maximum and being provided at the second non-contact charging module, the first non-contact charging module comprising:

a planar coil portion including a conductive wire wound in a rectangular shape; and a magnetic sheet provided with a surface on which the planar coil portion is placed, wherein the planar coil portion includes a rectangular-shaped hollow portion that has a short side shorter than 15.5 mm and a long side longer than 15.5 mm, the rectangular-shaped hollow portion of the planar coil portion has an outline in which every short side and long side of the outline is longer than the diameter of the circular magnet, and the circular magnet is positioned on top of the planar coil portion.

5. The first non-contact charging module according to claim 4, wherein the rectangular-shaped hollow portion includes a plurality of corner portions, and each corner portion of the plurality of corner portions includes a curved shape that starts to curve at a distance equal to 30% or less of a corresponding long side and 30% or less of a corresponding short side of the rectangular-shaped hollow portion.

6. The first non-contact charging module according to claim 5, wherein the circular magnet is greater than half a distance of a difference between a length of the long side of the rectangular-shaped hollow portion and the diameter of the circular magnet.

* * * * *